US006937998B1

(12) United States Patent
Swartz et al.

(10) Patent No.: US 6,937,998 B1
(45) Date of Patent: Aug. 30, 2005

(54) ARRANGEMENT FOR AND METHOD OF EXPEDITING TRANSACTIONS BASED ON A CUSTOMER'S PROXIMITY TO THE TRANSACTIONS

(75) Inventors: Jerome Swartz, Old Field, NY (US); Daniel R. McGlynn, Brooklyn, NY (US)

(73) Assignee: Symbol Technologies, Inc., Holtsville, NY (US)

(*) Notice: Subject to any disclaimer, the term of this patent is extended or adjusted under 35 U.S.C. 154(b) by 675 days.

(21) Appl. No.: 09/695,649

(22) Filed: Oct. 24, 2000

Related U.S. Application Data (60) Continuation-in-part of application No. 08/938,415, filed on Sep. 26, 1997, now Pat. No. 6,131,814, which is a continuation of application No. 08/457,507, filed on Jun. 1, 1995, now Pat. No. 5,736,721, which is a division of application No. 08/292,584, filed on Aug. 18, 1994, now Pat. No. 5,448,046, which is a continuation-in-part of application No. 07/921,414, filed on Jul. 27, 1992, now abandoned, which is a continuation of application No. 07/553,559, filed on Jul. 16, 1990, now abandoned, which is a continuation-in-part of application No. 07/392,207, filed on Aug. 10, 1989, now abandoned, which is a continuation-in-part of application No. 07/138,563, filed on Dec. 28, 1987, now Pat. No. 4,871,904.

(51) Int. Cl.$^7$ .................................. G06F 17/60
(52) U.S. Cl. ............... 705/26; 705/27; 455/456.1; 455/457; 342/358; 342/465
(58) Field of Search .................. 705/26–27, 16, 705/21, 22, 28–29; 370/310.1, 310.2, 912, 370/913, 328, 338, 343, 345; G06F 7/60, G06F 17/60; 455/456.1, 457; 342/358, 465

(56) References Cited

U.S. PATENT DOCUMENTS

| 4,372,741 A | | 2/1983 | Cane et al. | |
| 4,377,741 A | * | 3/1983 | Brekka et al. | 235/472.01 |
| 4,766,297 A | * | 8/1988 | McMillan | 235/462.07 |

(Continued)

FOREIGN PATENT DOCUMENTS

| DE | 3413887 A | * | 12/1984 | | B41J 3/20 |
| EP | 0 199 252 B2 | | 7/1991 | | |
| EP | 619662 A2 | * | 10/1994 | | H04L 12/28 |
| EP | 697793 A2 | * | 2/1996 | | H04N 7/15 |

(Continued)

OTHER PUBLICATIONS

Komura et al., Japan Telecomm. Rev. Quarterly, vol. 15, No. 4, 1973, pp. 257-261.*
Acampora, BSTJ, vol. 58, No. 9, Nov. 1979, pp. 2097-2111.*
Gfeller, IBM Disclosure Bulletin, vol. 24, No. 8, Jan. 1982, pp. 4043-4046.*
Acampora et al., IEEE Communications Magazine, vol. 22, No. 8, Aug. 1984, pp. 12-21.*

*Primary Examiner*—Cuong Nguyen
(74) *Attorney, Agent, or Firm*—Kirschstein, et al.

(57) ABSTRACT

A portable terminal carried by a user and in wireless communication with a local area network for displaying data based on the physical location of the user. A plurality of network nodes is distributed throughout a venue, such as a shopping mall or a store, in which products are offered for sale. The location of the user is determined by the location of the access node in communication with the terminal. The data may include a recommendation to purchase the product.

5 Claims, 8 Drawing Sheets

U.S. PATENT DOCUMENTS

| | | | |
|---|---|---|---|
| 4,789,983 A * | 12/1988 | Acampora et al. | 370/349 |
| 4,879,650 A * | 11/1989 | Kurimoto et al. | 705/21 |
| 5,108,052 A * | 4/1992 | Malewicki et al. | 246/5 |
| 5,979,757 A * | 11/1999 | Tracy et al. | 235/383 |
| 6,029,141 A * | 2/2000 | Bezos et al. | 705/27 |
| 6,049,533 A * | 4/2000 | Norman et al. | 370/328 |
| 6,119,096 A * | 9/2000 | Mann et al. | 705/5 |
| 6,314,406 B1 * | 11/2001 | O'Hagan et al. | 705/14 |
| 6,324,522 B2 * | 11/2001 | Peterson et al. | 705/28 |
| 6,386,450 B1 * | 5/2002 | Ogasawara | 235/383 |
| 6,477,156 B1 * | 11/2002 | Ala-Laurila et al. | 370/331 |
| 6,486,768 B1 * | 11/2002 | French et al. | 340/5.92 |
| 6,513,015 B2 * | 1/2003 | Ogasawara | 705/26 |
| 6,717,926 B1 * | 4/2004 | Deboille et al. | 370/330 |
| 2002/0019985 A1 * | 2/2002 | Fuccello et al. | |
| 2003/0137453 A1 * | 7/2003 | Hannah et al. | |
| 2004/0095916 A1 * | 5/2004 | Maki et al. | |
| 2004/0162084 A1 * | 8/2004 | Wang | |

FOREIGN PATENT DOCUMENTS

| | | | | |
|---|---|---|---|---|
| EP | 744856 A2 * | 11/1996 | | H04M 3/42 |
| EP | 0 341 717 B1 | 7/1997 | | |
| GB | 2384719 A * | 8/2003 | | A63F 13/00 |
| JP | 61-123563 A | 6/1987 | | |
| JP | 02-153199 A | 2/1990 | | |
| JP | 02-064799 A | 3/1990 | | |
| JP | 2002359863 A * | 12/2002 | | H04Q 7/20 |
| JP | 2003060653 A * | 2/2003 | | H04L 12/28 |
| JP | 2003174457 A * | 6/2003 | | H04L 12/28 |
| KR | 2001103865 A * | 11/2001 | | G06F 17/21 |
| WO | WO 9908429 A1 * | 2/1999 | | H04L 29/08 |
| WO | WO 2002101625 A1 * | 12/2002 | | G06F 17/60 |

* cited by examiner

ARRANGEMENT FOR AND METHOD OF EXPEDITING TRANSACTIONS BASED ON A CUSTOMER'S PROXIMITY TO THE TRANSACTIONS

CROSS REFERENCE TO RELATED APPLICATIONS

This application is a continuation-in-part of U.S. patent application Ser. No. 08/938,415, filed Sep. 26, 1997, now U.S. Pat. No. 6,131,814, now allowed, which, in turn, is a continuation of U.S. patent application Ser. No. 08/457,507, filed Jun. 1, 1995, now U.S. Pat. No. 5,736,721, which, in turn, is a division of U.S. patent application Ser. No. 08/292,584, filed Aug. 18, 1994, now U.S. Pat. No. 5,448,046, which, in turn, is a continuation-in-part of U.S. patent application Ser. No. 07/921,414, filed Jul. 27, 1992, now abandoned, which, in turn, is a continuation of U.S. patent application Ser. No. 07/553,559, filed Jul. 16, 1990, now abandoned, which, in turn, is a continuation-in-part of U.S. patent application Ser. No. 07/392,207, filed Aug. 10, 1989, now abandoned, which, in turn, is a continuation-in-part of U.S. patent application Ser. No. 07/138,563, filed Dec. 28, 1987, now U.S. Pat. No. 4,871,904. This application is related to U.S. patent application Ser. No. 07/966,906, filed Oct. 22, 1992, now abandoned, which is a continuation of U.S. patent application Ser. No. 07/553,558, filed Jul. 16, 1990, now abandoned.

BACKGROUND OF TH INVENTION

1. Field of the Invention

The present invention generally relates to an arrangement for and a method of providing information to users in a venue, the information being relevant to the physical location of a respective user in the venue and, more particularly to expediting commercial transactions based on a customer's proximity to the transactions, by recommending products, services, and the suppliers of such products and services, as well as providing useful information relating to such products, services and suppliers, thereby expediting the offering for sale, sale and processing of the products and services.

2. Description of the Related Art

The prior art has proposed various ways of expediting the processing of commercial products offered for sale to potential customers. These include the labeling of products with indicia such as bar code symbols which are electro-optically read by portable, hand-held readers of the type generally disclosed, for example, in U.S. Pat. No. 4,251,798; No. 4,360,798; No. 4,369,361; No. 4,387,297; No. 4,593,186; No. 4,496,831; No. 4,409,470; No. 4,460,120; No. 4,607,156; No. 4,673,805; No. 4,736,095; No. 4,758,717; No. 4,760,248; No. 4,806,742; No. 4,808,804; No. 4,825,057; No. 4,816,661; No. 4,816,660; No. 4,845,350; No. 4,835,374; and No. 4,871,904; all of these patents having been assigned to the same assignee as the instant application, and being hereby incorporated herein by reference.

The reading of the symbols identify the products bearing the symbols. This information can be used to retrieve price information from a database, or to control inventory.

SUMMARY OF THE INVENTION

Objects of the Invention

Accordingly, it is a general object of the present invention to expedite the processing of commercial products and services offered for sale to potential customers.

More particularly, it is an object of the present invention to provide customers with an advance notification of the prices for the products, to enable customers to print price labels with updated price information prior to checkout, and to complete a commercial transaction by reading credit or debit cards at the point of sale site.

A still further object of the present invention is to recommend products and services, as well as the suppliers of such products and services, to potential customers based on the customer's proximity to the products and services, and to the suppliers thereof.

Still another object of the present invention is to recommend products and services not only based on the customer's proximity to the products and services, but also based on the customer's shopping or transaction profile.

Yet another object of the present invention is to provide information to users in a venue, the information being relevant to the physical location of a respective user in the venue.

FEATURES OF THE INVENTION

In keeping with the above objects and others which will become apparent hereafter, one feature of the present invention resides, briefly stated, in a method of and an arrangement for providing information to users in a venue, the information being relevant to the physical location of a respective user in the venue and, more particularity, to expediting commercial transactions to potential customers passing through an environment in which the transactions are offered for sale. For example, the environment may be a department store, a supermarket, a shopping mall, a flea market, a trade show, an airport, a train station, and, in general, any large public space in which the transactions are distributed at different locations. The environment may even include a large vehicle, such as an airplane or a train, as explained below.

A plurality of access nodes of a local area network is located in a spaced-apart relationship throughout the environment among the transactions. Customers entering the environment are provided with, or already have, portable, hand-held terminals in wireless communication with the access nodes. The terminals advise the network of the identity of each customer and of the proximity of each customer to the transactions.

In accordance with one feature of this invention, products or services, or the suppliers of such products or services, are recommended to each identified customer based on the customer's proximity to the products, services or suppliers being recommended and, preferably, based on the customer's shopping or transaction profile which contains data about earlier purchases. More specifically, each customer entering the environment is supplied with, or already has, a portable, hand-held terminal having a bidirectional transceiver in wireless, radio frequency communication with the local area network. The terminal held by the customer is able to communicate with any one of the nodes of the network that is within range. As the customer travels through the environment, the terminal communicates with a different node depending on the customer's location. No matter where the customer is physically situated at any one time, the network can determine the approximate physical location of the customer based on which node is receiving a transmission from the terminal held by the customer at that time.

The network accesses one or more databases in which the products or the services or their suppliers, and their location are known. Hence, if the network determines that a customer is near a product, service or supplier to be promoted, then the network signals the terminal to recommend the product, service or supplier to the customer, preferably by displaying a visual display on a screen of the terminal. The physical proximity of the customer to the product, service or supplier being promoted encourages the completion of the sale. Any information can be stored in the database, and the stored information can be displayed on the terminal, again based on the customer's physical location.

Optionally, the customer's shopping profile is available as another database to the network. This shopping profile can be created over time by recording the customer's transactions, or can be created with the customer's assistance by filling out a survey, or can be automatically loaded into the network by, for example, reviewing the customer's credit card purchases for a past time period. Once the profile is known, the network can recommend products or services that have more relevance to the customer. For example, a customer having a pet dog is more likely to be receptive to being prompted to buy dog food, or to hire a dog grooming service.

Another feature is to enable the customer to know the price of a promoted product in advance of checkout. The terminal can be provided with an on-board reader for electro-optically reading indicia such as a bar code symbol uniquely associated with the promoted product. Preferably, the reader includes a light source for directing a light beam, preferably a laser beam, to the symbol, a detector for detecting at least a portion of light of variable intensity reflected off each symbol over a field of view, a scanner for scanning at least one of the laser beam and the field of view, and a signal processor for processing an electrical signal indicative of the detected light intensity into data identifying the product bearing the symbol.

Each time a product has been identified, the network interrogates a price database and retrieves the price which is then displayed on the terminal screen to reliably apprise the customer of the actual price of the item prior to checkout.

Still another feature is to print a label with the price information in human-readable and/or machine-readable form. The updated label is thereupon applied to the identified product. The printing of the updated label may be performed by a printer on-board the terminal, or located remotely therefrom, e.g., a portable printer in wireless communication with the terminal and held separately by the customer.

In a preferred embodiment, the printer is a thermal printer that is powered by a reusable, rechargeable battery. The printer advantageously prints on leading portions of a paper roll of tear-off labels not only the aforementioned price information, but also sequence numbers indicative of the number of times that the printer has printed—a feature useful in preventing pilferage.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
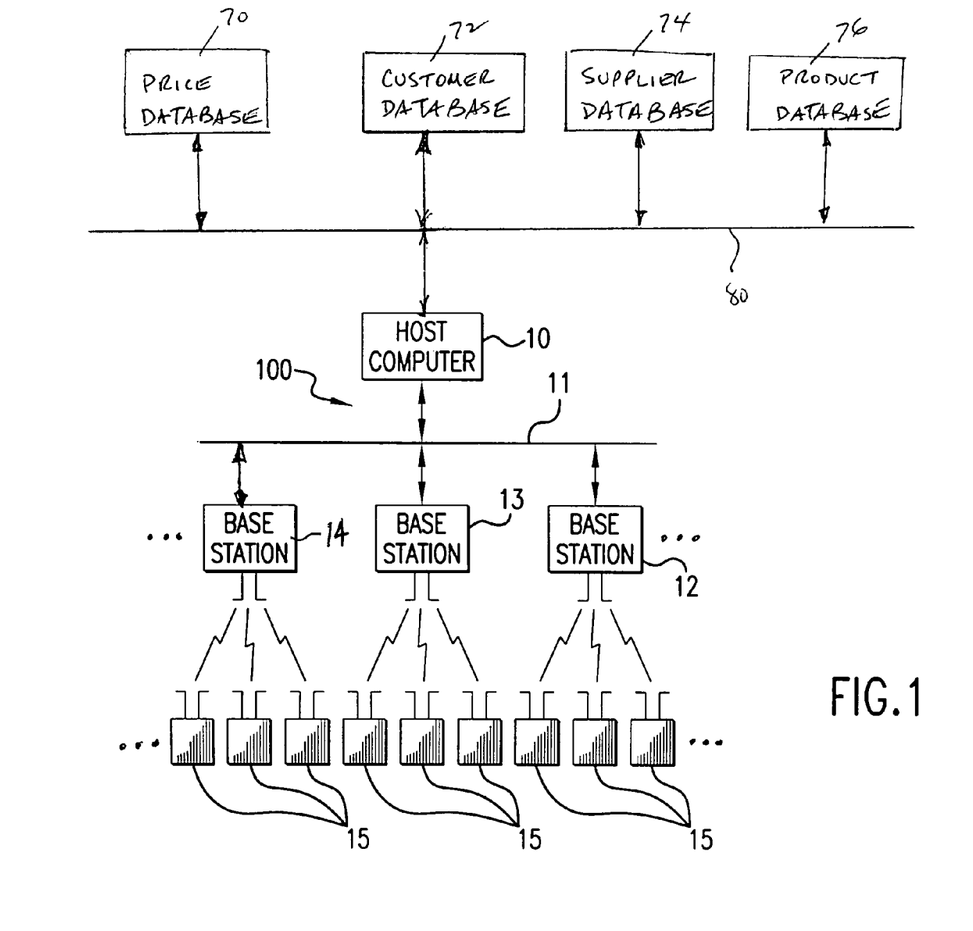
FIG. 1 is a general overall schematic view of a system for expediting commercial transactions in accordance with this invention.

Referring now to the figures, FIG. 1 shows a local area network (LAN) 100 including a host computer or processor 10 which is connected by a wired communications link 11 to a number of stationary access points, nodes or base stations 12, 13, 14. Each one of the base stations 12, 13, 14 is coupled by a wireless, radio frequency transceiver or link to a number of remote mobile units or terminals 15. Preferably, the remote mobile terminals 15 are hand-held, battery-operated data terminals or voice communication handsets such as described in U.S. Pat. No. 5,029,183; and U.S. Ser. No. 08/794,782, filed Feb. 3, 1997, and U.S. Ser. No. 09/008,710, filed Jan. 16, 1998, all assigned to the assignee of the instant application and incorporated herein by reference.

Various other types of remote terminals may be advantageously employed. These remote terminals ordinarily would include data entry facilities such as a keyboard, a magnetic card reader or the like, as well as a display (or printer) for indicating to a terminal user information detected, transmitted and/or received by the terminal. A multitude of the base stations (only three stations being shown in FIG. 1) and a multitude of the remote terminals (only nine terminals being shown in FIG. 1) are contemplated for use with the present invention. Each terminal is uniquely associated with a single user. The number of base stations is independent of the number of users.

Figure 2:
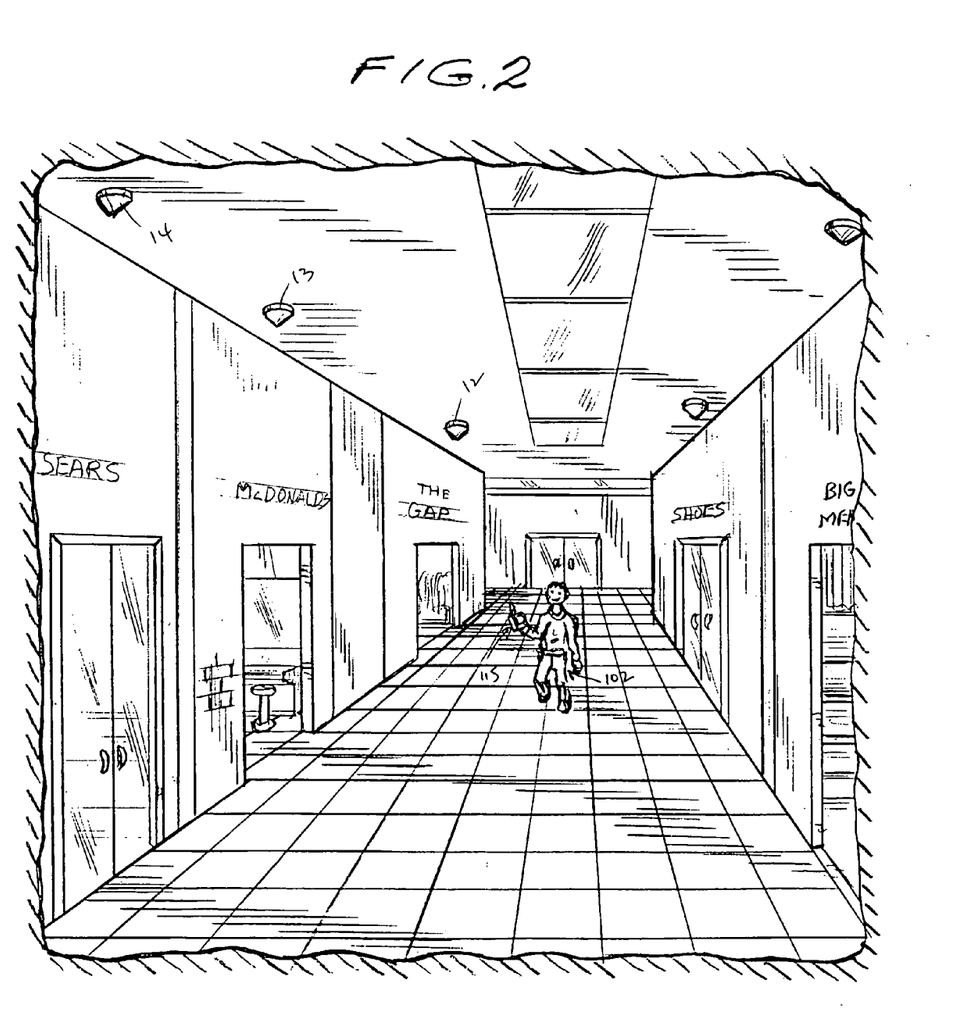
FIG. 2 is a perspective view of a customer in a shopping mall using a mobile terminal in accordance with this invention.
Figure 3:
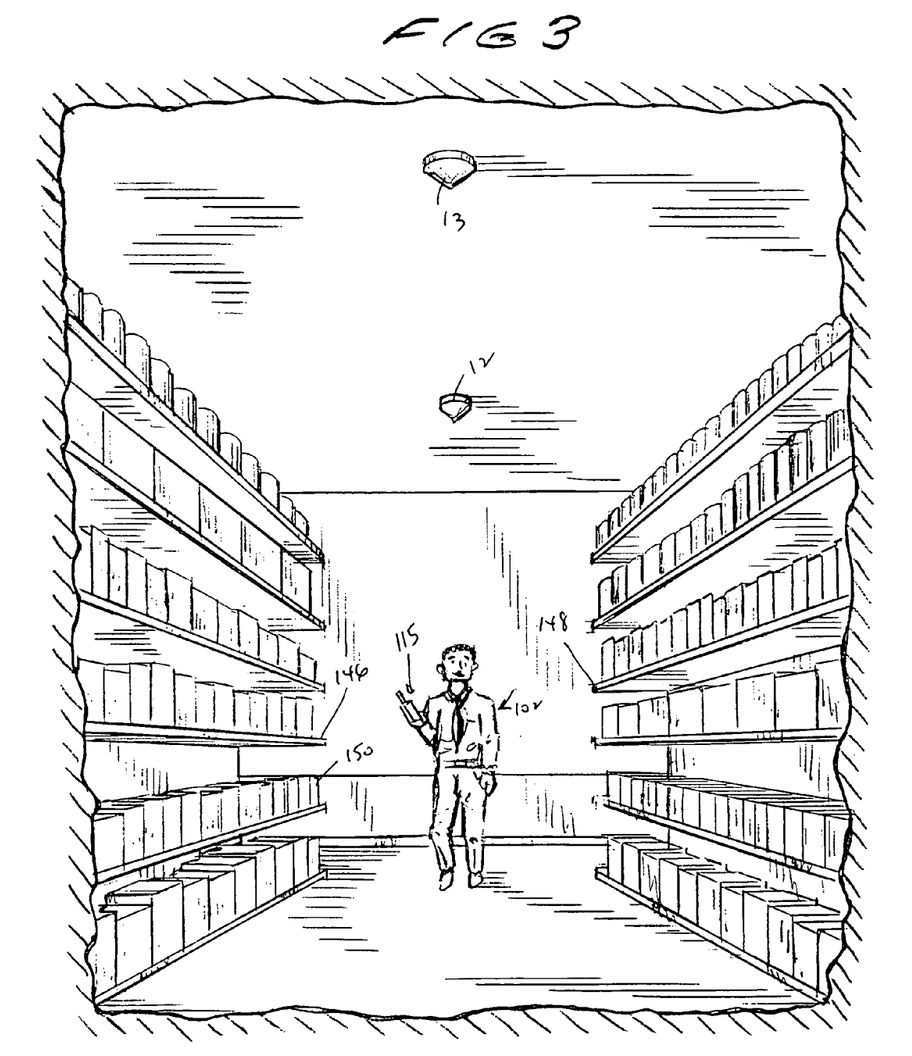
FIG. 3 is a perspective view of a customer in a supermarket using a mobile terminal in accordance with this invention.

The base stations are distributed in a spaced-apart relationship throughout an environment or venue. As noted above, the environment may be a department store, a supermarket, a flea market, and, in general, any large space in which commercial products and services are offered for sale to potential customers. The environment may be a shopping mall, a trade show, and, in general, any large space in which suppliers or stores offering such products and services for sale are situated. FIG. 2 depicts a shopping mall venue in which a customer holding one of the terminals 15 is shopping. FIG. 3 depicts a supermarket venue in which a customer holding one of the terminals is walking down an aisle along which products are being offered for sale. The environment may be a sports arena or stadium, an airport, a bus or train station and, in general, any venue where a user is typically in need of information such as directions to a particular gate or seat. The environment may even be a vehicle such as an airplane or train where the user may need information or assistance.

As described below, the terminals 15 may advantageously be hand-held, laser scanning bar-code reader data terminals, or bar-code readers of the CCD or wand type, and may also be voice communication handsets, pagers, still image or video cameras, or any combination of the foregoing.

Figure 4:
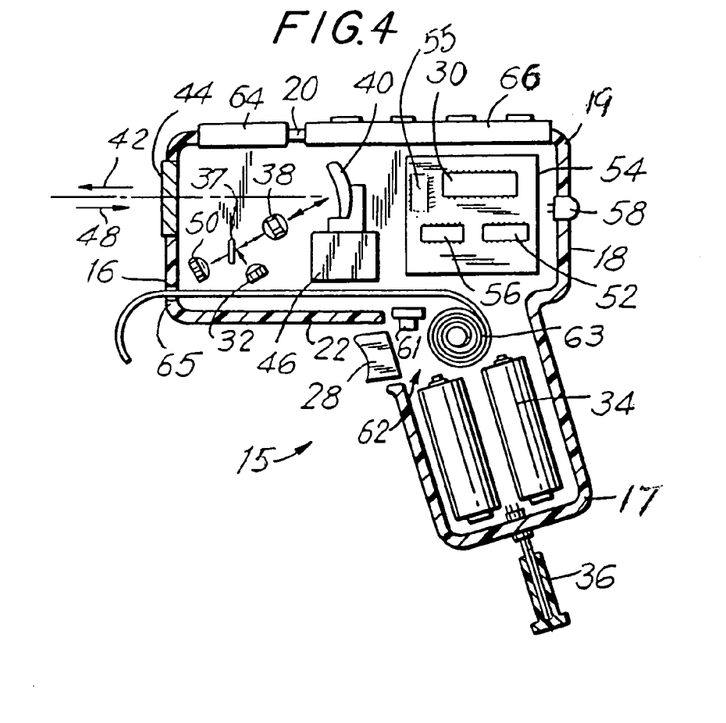
FIG. 4 is a sectional view of one embodiment of a hand-held mobile terminal for use in the present invention.

For example, FIG. 4 of the drawings depicts a lightweight (less than 1 lb.), narrow-bodied, streamlined, hand-held, fully-portable, easy-to-manipulate, non-arm-and-wrist-fatiguing, mobile terminal 15 supportable entirely by a customer and aimable, both prior to and during reading thereof, by the customer at a symbol on a product, each symbol in its turn, for obtaining a price for the product. The term "symbol" as used herein is intended to cover indicia composed of parts having different light-reflective properties. The indicia may be industrial symbols, e.g. Code 30, Codabar, Interleaved 2 or 5, etc., or the omnipresent Universal Product Code (UPC) bar code symbol. The indicia may also be composed of alphabetic and/or numeric characters.

The terminal 15 includes a generally gun-shaped housing having a handle portion 17 of generally rectangular cross-section, and a generally horizontally-elongated, narrow-bodied barrel or body portion 19. The dimensions and overall size of the handle portion 17 are such that the terminal 15 can conveniently fit and be held in the operator's hand. The body and handle portions are constituted of a lightweight, resilient, shock-resistant, self-supporting material such as a synthetic plastic material. The plastic housing is preferably injection-molded and forms a thin, hollow shell whose interior space measures less than a volume on the order of 50 cubic inches.

Figure 5:
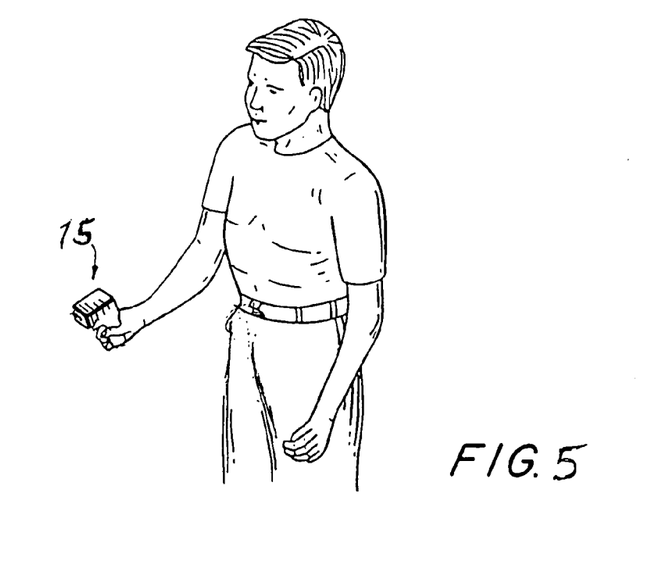
FIG. 5 is a perspective view of the terminal of FIG. 4 in use.

As considered in an intended position of use, as shown in FIG. 5, the body portion 19 has a front wall 16, a rear wall 18 spaced rearwardly of the front wall, a top wall 20, a bottom wall 22 below the top wall, and a pair of opposed side walls 24, 26 that lie in mutual parallelism between the top and bottom walls.

A manually-actuatable, and preferably depressible, trigger 28 is mounted for pivoting movement about a pivot axis on the head in a forwardly-facing region where the handle and body portions meet and where the operator's forefinger normally lies when the operator grips the handle portion in the intended position of use.

A plurality of components is mounted in the terminal and, as explained below, at least some of them are actuated by the trigger 28, either directly or indirectly, by means of a control microprocessor 30. One of the terminal components is an actuatable light source, e.g., a semiconductor laser diode 32 or a light emitting diode, operative, when actuated by the trigger 28, for propagating and generating an incident light beam. In the case of a laser, the light beam is highly divergent, is non-radially symmetrical, is generally oval in cross-section, and has a wavelength above 7000 Angstrom units. The laser diode 32 may be of the continuous wave or pulse type. The diode 32 requires a low voltage, e.g., 12 volts DC or less, supplied by a battery 34 which may be provided within the handle portion 17 or by a rechargeable battery pack accessory detachably mounted on the terminal, or by a power conductor in a cable connected to the terminal from an external power supply.

An optical assembly, including a half-silvered mirror 37 and an optical train 38, is mounted in the terminal, and is adjustably positioned relative to the diode 32 for optically modifying and directing the incident laser beam along a first optical path toward a reference plane which is located exteriorly of the terminal forwardly of the front wall 16 and which lies generally perpendicular to the longitudinal direction along which the incident laser beam propagates. A symbol to be read is located at the vicinity of the reference plane, either at, or at one side, or at an opposite side, of the reference plane, that is, anywhere within the depth of focus or field of the optically-modified incident laser beam. The depth of focus or field is also known as the working distance in which the symbols can be read. The incident laser beam reflects off each symbol in many directions, and that portion of the reflected laser light which travels away from the symbol back toward the terminal is known herein as the returning portion.

The laser beam passing through the optical train 38 impinges on a generally planar portion of a scanning mirror 40 for reflection therefrom. The scanning mirror 40 forwardly reflects the laser beam impinging thereon in the direction of an arrow 42 through a forwardly-facing light-transmissive window 44 mounted on the front wall 16 and to the symbol.

The scanning mirror 40 is mounted on a scanning component, preferably a high-speed scanner motor 46 of the type shown and described in U.S. Pat. No. 4,387,297, the entire contents of which are incorporated herein by reference. For purposes of this application, it is sufficient to point out that the motor 46 has an output shaft on which a support bracket is fixedly mounted. The scanning mirror 40 is fixedly mounted on the bracket and is driven in alternate circumferential directions over arc lengths of any desired size, typically less than 360°, and at a rate of speed on the order of a plurality of oscillations per second. In a preferred embodiment, the scanning mirror 40 and the shaft are reciprocally and repetitively oscillated so that the scanning mirror repetitively sweeps the incident laser beam impinging on the mirror through an angular distance or arc length at the reference plane of about 32° and at a rate of about 20 scans or 40 oscillations per second.

The returning portion of the reflected laser light has a variable light intensity due to the different light-reflective properties of the various parts that comprise the symbol over the symbol during the scan. The returning portion of the reflected laser light is collected in the direction of arrow 48 by a generally concave spherical portion of the mirror 40. The generally planar mirror portion is integrally attached to the generally spherical mirror portion of the mirror 40. The spherical portion reflects the collected light through the optical train 38, the half-silvered mirror 37, and to a sensor, e.g., a photosensor 50. The photosensor 50, preferably a photodiode, detects the variable intensity of the collected laser light over a field of view which extends along, and preferably beyond, the scan, and generates an electrical analog signal indicative of the detected variable light intensity.

Also mounted in the terminal is signal processing circuitry 52 mounted on a circuit board 54, and operative for processing the analog electrical signal generated by the photodiode 50 into a digitized video signal. Data descriptive of the symbol can be derived from the video signal. Suitable signal processing circuitry for this purpose was described in U.S. Pat. No. 4,251,798. Other components within the terminal include drive circuitry for the motor 46, an aiming light controller in the event that the laser diode 32 generates a laser beam which is not readily visible to the human eye, and a voltage converter for converting incoming voltage, e.g., from the battery 34, to a regulated voltage suitable for energizing the laser diode 32.

Also mounted on the circuit board 54 is a decode/control circuit 56 operative for decoding the digitized video signal to a digitized decoded signal from which the desired data descriptive of the symbol is obtained in accordance with an algorithm contained in a software control program in the microprocessor 30. The decode/control circuit includes a PROM for holding the control program, and a RAM for temporary data storage. The decode/control circuit 56, together with the microprocessor, determine when a successful decoding of the symbol has been obtained, and also terminates the reading of the symbol upon the determination of the successful decoding thereof. The initiation of the reading is caused by depression of the trigger 28. The decode/control circuit also includes control circuitry for controlling the actuation of the actuatable components in the terminal, namely, the laser diode 32, the photodiode 50, the motor 46, and all the other electronic subcircuits therein, as initiated by the trigger, as well as for communicating with the user that the reading has been automatically terminated as, for example, by sending a control signal to an indicator lamp 58 to illuminate the same or by energizing an auditory buzzer or beeper.

The decoded signal is transmitted by radio frequency from a transceiver 55 on the board 54 to a base station 12, 13, 14 by means of antenna 36 and, in turn, to the host computer 10 of the network 100, and provides information related to the decoded signal. For example, the host computer, in accordance with this invention, can provide retail price information on an updated basis corresponding to the products identified by their decoded symbols. The host computer can advantageously interrogate a price database 70.

A keyboard 66 may advantageously be provided on the terminal for entering data relating to the symbol and/or the product bearing the same. A display 64 is also conveniently mounted adjacent the keyboard 66 on the top wall 20 of the terminal, and is operative for displaying information relating to the symbol and/or the product bearing the same.

As described so far, each product bearing a label imprinted with a symbol is identified by scanning the symbol with the hand-held terminal in the manner depicted in FIG. 5. Information such as price is retrieved on a real-time basis from the database 70 of the host computer 10. The stored information is periodically updated, for example, by keyboard entry, to reflect price increases or decreases.

In the event that the information stored in the database 70 has been updated, this invention proposes printing an updated label with machine-readable and/or human-readable data reflecting the updated information. The printing is performed by a printer 62 that is either incorporated in the hand-held terminal 10 (see FIG. 4) or held in one's other hand, or worn on one's person. The printer includes a thermal printhead 61 operative for thermally imprinting graphical markings on a journalled roll 63 of paper labels, each printed label being torn off the roll by being urged against tear-off edge 65 at the front of the head 10. The updated label preferably has a pressure-adhesive backing so that it can be applied directly on the product, either adjacent to, or preferably as an overlay to, the existing label on the product.

The terminal 15 of FIG. 4 is of the retro-reflective type wherein the outgoing incident laser beam, as well as the field of view of the sensor, are scanned. It will be readily understood that other variants also are within the spirit of this invention. For example, the outgoing incident laser beam can be directed to, and swept across, the symbol through one window on the terminal, while the field of view is not scanned and the returning laser light is collected through another window on the terminal. Also, the outgoing incident beam can be directed to, but not swept across, the symbol, while the field of view is scanned.

Figure 6:
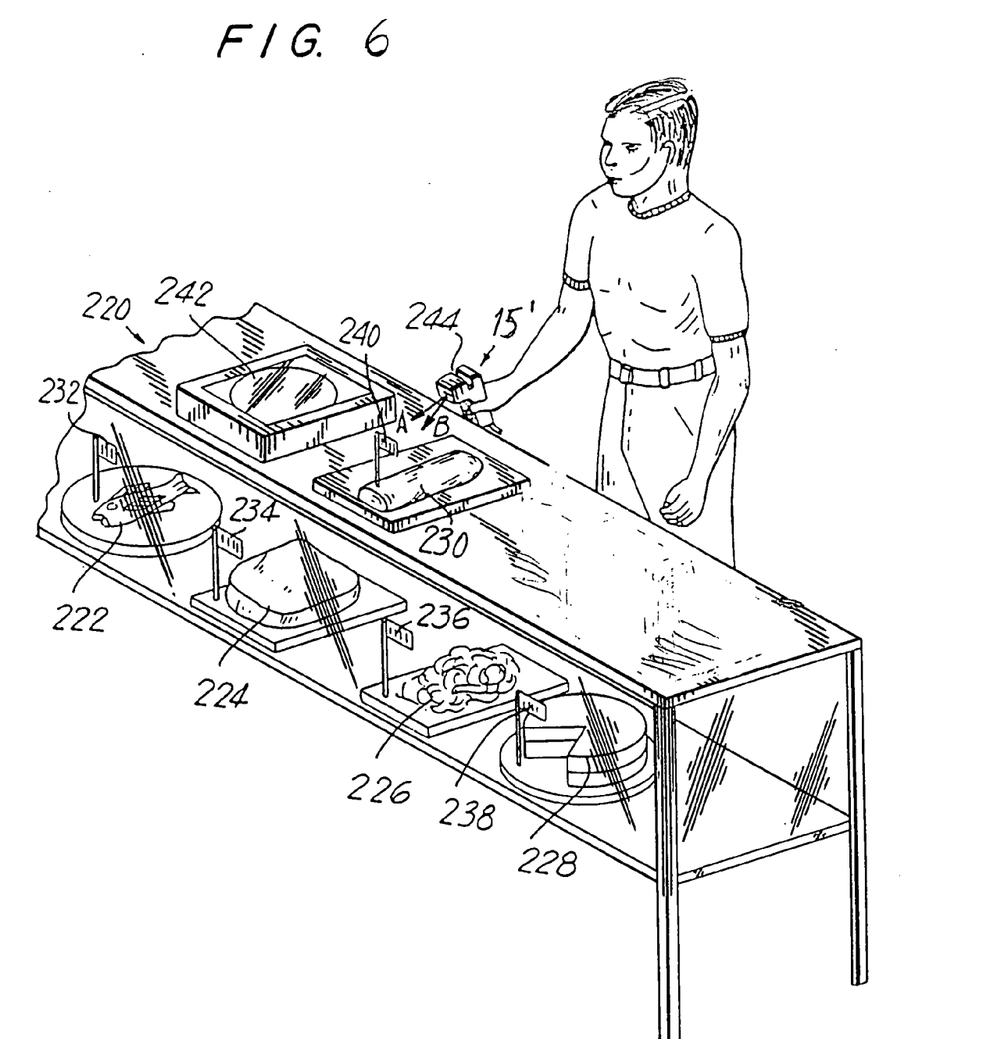
FIG. 6 is a front perspective view of a terminal according to this invention in use at a retail point-of-sale location.

Turning now to FIG. 6, a point-of-sale counter 220, such as an appetizing counter, has a plurality of appetizing products such as fish 222, meat 224, potato salad 226, cheese 228, salami 230, just to mention a few exemplary choices. Each product is associated uniquely with a bar code symbol. For example, flags 232, 234, 236, 238, 240 bear unique coded symbols which, when electro-optically scanned, decoded and read, respectively identify the products 222, 224, 226, 228, 230. A customer stands in front of the counter 220 and holds a scanner 15' of the type shown in FIG. 4.

In use, a customer walks up to the counter 220 and aims the scanner 15' at the flag 240 which represents a selected product 230. It is this optical identification of the product which prevents operator error as is common with manual entry of product identification codes in known systems.

With the identity of the product known, a label is printed, and applied to the selected product 230, typically on a paper wrapping therefor.

In a modification, the scanner 15' is provided with a slot 244 through which magnetically encoded credit or debit cards are passed for the purpose of charging the customer's account, all at one location.

This invention is not intended to be limited to food counters, since any merchandise can be optically read in the manner described above. In a retail situation such as a clothing store, the scanner 10 could additionally be provided with a tag deactivator of the type described in U.S. Ser. No. 07/236,249, filed Aug. 25, 1988, now abandoned.

As previously mentioned, the printing of a symbol is performed by a printer that is either incorporated in the hand-held terminal, or held in one's other hand, or worn on one's person. The printer advantageously includes a thermal printhead operative for thermally imprinting graphical markings on a journalled roll of paper labels, each printed label being torn off the roll by being urged against a tear-off edge at the front of the printhead. The label preferably has a pressure-adhesive backing so that it can be applied directly on the product or packaging therefor.

Figure 7:
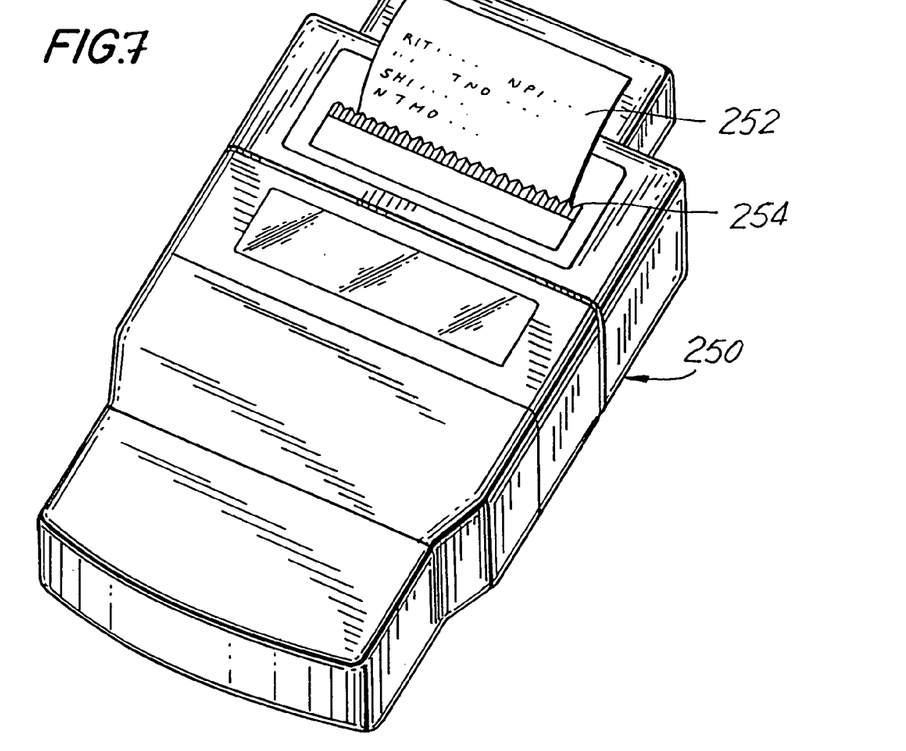
FIG. 7 is a front perspective view of a printer for use with this invention.
Figure 8:
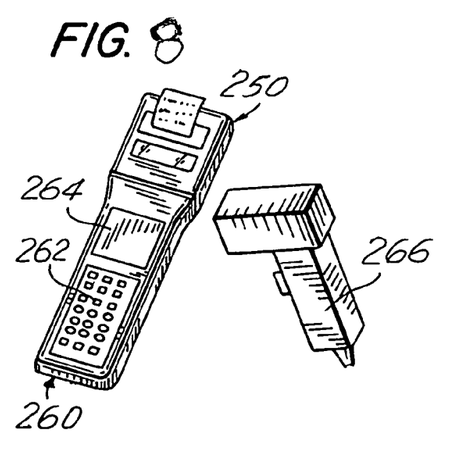
FIG. 8 is a front perspective view of the printer of FIG. 7 in wireless communication with a portable data terminal.
Figure 9:
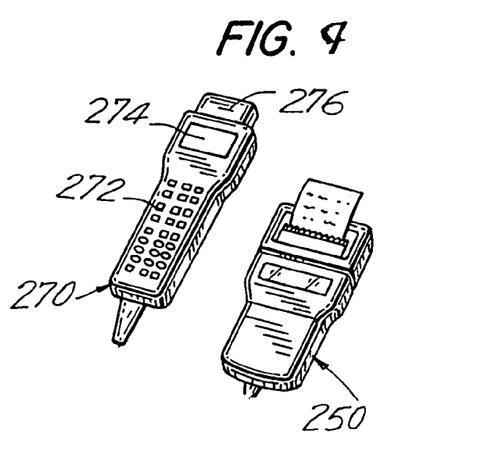
FIG. 9 is a front perspective view of a printer integrated with a terminal and in wireless communication with a scanner.

FIG. 7 illustrates a printer 250 for printing transaction receipts. The printer 250 includes a thermal printhead for imprinting graphical markings on a paper roll 252, each receipt being torn off the roll by being urged against a tear-off edge 254. Printer 250 may be used as a stand-alone printer, or can be carried in one's hand, or on one's person in a holster, or as shown in FIGS. 8 and 9, can be in wireless communication with a portable data terminal. The printer 250 may be provided with or without a magnetic strip reader, can print on single-or two-ply plain paper, and includes an internal paper advance button for loading, as well as a single-line paper advance button. Other features include a low battery warning light and a battery charging light.

FIG. 8 illustrates an alternative printer/scanner arrangement which can be used with the present invention. The arrangement comprises a portable data terminal 260 having a keyboard 262 for data entry, and a screen 264. Attached to the portable data terminal is the integrated printer 250. A separate bar code reader 266 is in radio communication with the terminal.

An alternative printer/scanner arrangement is shown in FIG. 9. As before, this comprises a portable data terminal 270 having a keyboard 272 and a screen 274. However, in this case the terminal incorporates an integral scanner 276. In radio communication with the terminal is the printer 250.

Figure 10:
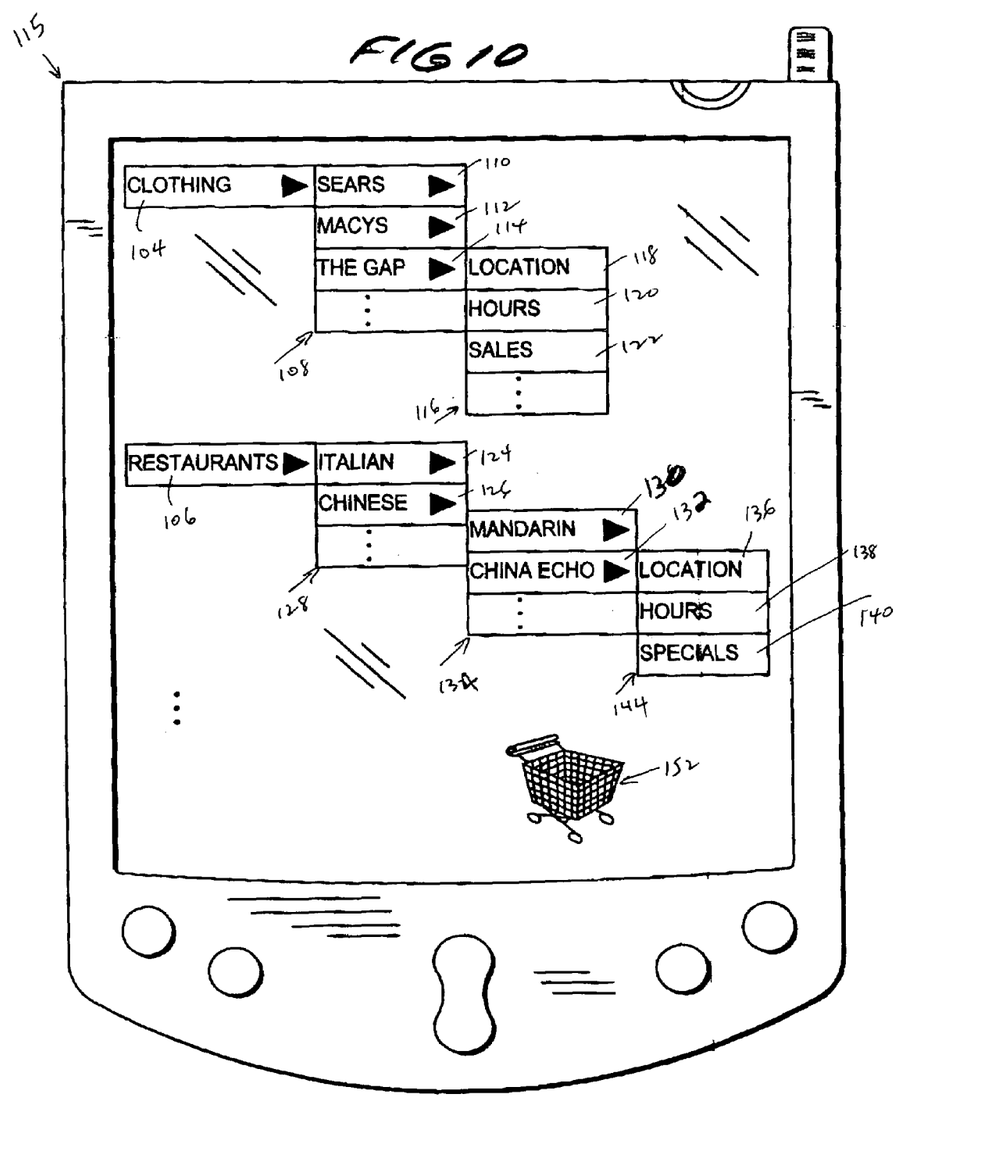
FIG. 10 is an enlarged, front elevational view of another embodiment of a mobile terminal in use according to this invention.

Referring again to FIG. 2, a customer 102 is holding a mobile terminal 115 in a shopping mall environment. The terminal 115 is best seen in FIG. 10 and is similar to the mobile terminal 15 depicted in FIG. 4 in the sense that the terminal 115 contains, among other things, a transceiver 55, an antenna 36 and a display 64. The shape of terminal 115 is, however, not gun-shaped, but more box-like and, indeed, has the configuration of a personal digital assistant of the kind typically marketed under the trademark PALM PILOT™.

The customer may own his or her own personal terminal 115, or may be given temporary custody of one such terminal upon entering the mall. The terminal may be personalized for each customer by pre-loading the identity of the customer, or by loading the customer's identity in situ at the mall. If only general information suitable for all mall customers is desired, then the terminal need not be personalized. Customer identity information is stored in a customer database 72.

It will be seen in FIG. 2 that the base stations 12, 13, 14 are mounted on the ceiling at spaced-apart locations, one for each store or supplier of products and services. The customer outside base station 13, for example, will receive information displayed on the screen of the terminal that is pertinent only to the supplier (in this case, McDonalds®) associated with base station 13. This information might include specials, discounts or promotions being offered for products on sale in the store. The customer can quickly walk past successive stores and canvass whatever promotions are currently being offered and act accordingly. Supplier information is stored in a supplier database 74.

This invention also contemplates that one of the base stations located in a common area, for example, at the main entrance of the mall, or at an elevator or escalator on each floor of the mall, be used for general information gathering purposes. For example, the terminal 115 in FIG. 10 displays on its screen a series of icons, such as "clothing" icon 104 and "restaurant" icon 106. These icons, as well as others, are displayed in response to signals received between the terminal 115 and the common base station.

If a user selects the clothing icon 104, either by touching the icon 104 with a stylus, or by maneuvering a pointer on the icon 104 by use of a joystick, mouse, voice, or analogous pointing control device and by thereupon actuating the device, a first cascading menu 108 having store icons 110, 112, 114 bearing the identities of clothing stores in the mall appears on the terminal screen. By selecting one of the store icons 114, a second cascading menu 116 having information icons 118, 120, 122 bearing such labels as location, hours and sales appears on the screen. By selecting one of the information icons 118, 120, 122, the requested information will appear on the screen.

In analogous fashion, if the user selects the restaurant icon 106, then the user in successive fashion may select one of the restaurant category icons 124, 126 from the restaurant category menu 128, one of the named restaurants 130, 132 from the name menu 134, and one of the information icons 136, 138, 140 from the information menu 142 to obtain the requested information.

Thus, a customer 102 at the mall may consult his or her terminal to locate a particular supplier of products and services and/or to canvass individual suppliers. Having such information readily at hand expedites the processing of a mall transaction. All such information is stored in the supplier database 74.

FIG. 3 depicts the customer 102 holding the mobile terminal 115 inside a store and, as shown, walking underneath base stations 12, 13 down an aisle between products offered for sale on shelves 146, 148. If base station 12 is receiving a signal from the terminal, then the network knows the physical location of the terminal and of the customer, i.e., within a working range of the base station 12. If a product database 76 determines that a product, such as dog food 150, in proximity to the customer would be of interest to the customer because the customer database 72 knows that this customer owns a dog or has previously made a dog food purchase, then the host computer 10 will signal the base station 12 which, in turn, will signal the terminal 115 to advise the customer that a product of possible interest is located in his or her vicinity. The terminal can sound an auditory alarm, or preferably, the product of interest is displayed on the screen of the terminal.

As described, information relevant to the customer's physical location is delivered to the terminal held by the customer. Thus, a customer located at a common area of a mall is provided with general directory information (FIG. 10). A customer located outside a retail store is provided with more specific information about that store (FIG. 2). A customer inside a store (FIG. 3) is provided with even more specific information about products being offered for sale. The product information can be a general sales promotion or a product recommendation, preferably a recommendation that is tailored to the customer based on the customer's shopping profile and history. All this information is geared toward expediting the completion of a transaction involving a product and/or a service and combines aspects of impulse buying with the customer's proximity to the transaction.

Another shopping aid relates to a shopping cart icon 152 seen in FIG. 10 on the terminal screen. It is envisioned that a user may select one of the suppliers and "drag and drop" the supplier selection onto the cart icon 152 in a time order. The terminal will then remind the customer by a series of alarms at certain times of the selected order, thereby directing the customer to the correct supplier at the correct time and serving as an appointment keeper.

Figure 11:
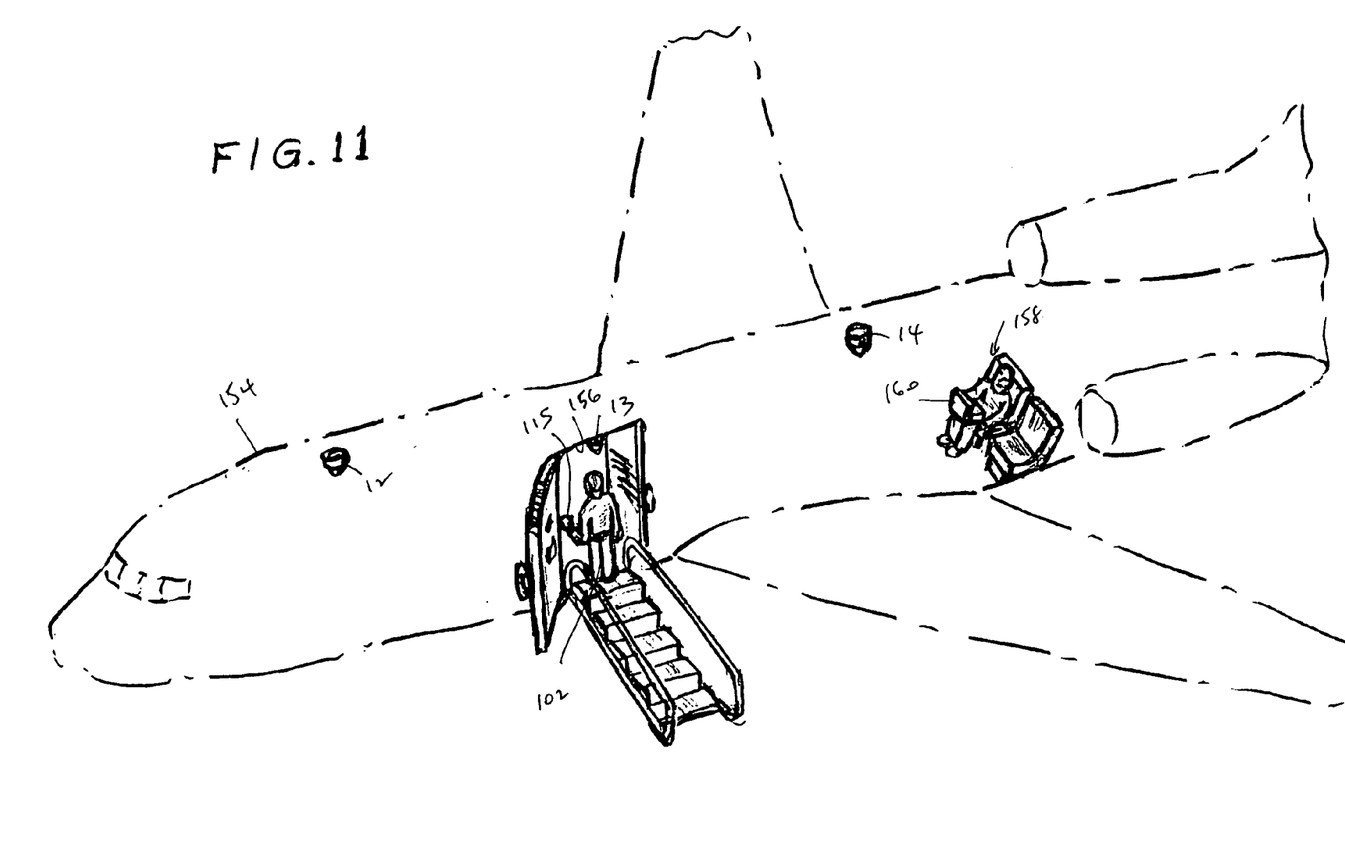
FIG. 11 is a schematic view of aircraft passengers using a mobile terminal according to this invention.

FIG. 11 depicts an airplane 154 which could serve as the environment throughout which the base stations 12, 13, 14 are distributed. A passenger 102 holding or wearing a mobile terminal 115 and boarding the airplane is detected by the station 13 adjacent a doorway 156. The information on the terminal 115 might indicate seat directions, e.g., turn left for first class seats in the vicinity of station 12, or turn right for coach seats in the vicinity of station 4.

Rather than using the gun-shaped terminal of FIG. 4, or the personal digital assistant-sized terminal of FIG. 10, a laptop computer 160 having an on-board transceiver can be configured to communicate by wireless transmission to a station 14 in the vicinity of a seated passenger 158 operating the computer 160. The seated passenger can obtain flight information, or request service from flight attendants, at the computer by bidirectional communication with the station 14.

Returning to FIG. 1, a suitable low power, radio frequency wireless transmission standard protocol between each terminal and base station employs Bluetooth wireless technology. The Bluetooth specification is available at the internet website: www.bluetooth.com.

The working range between each terminal and base station is preferably about 10–50 feet depending on the application. The base stations need not be mounted on the ceiling, but could be mounted anywhere in the venue.

Communication between each base station and the host computer may be wired or wireless. The host computer can access the databases 70, 72, 74, 76, either locally, or remotely by a link 80. Preferably, the link 80 is a wireless communications link connected over the internet to the databases.

It will be understood that each of the elements described above, or two or more together, also may find a useful application in other types of constructions differing from the types described above.

While the invention has been illustrated and described as embodied in an arrangement for and method of expediting transactions based on a customer's proximity to the transactions, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A method of recommending transactions to potential customers traveling through a venue in which the transactions are offered, comprising the steps of:
   a) enabling each customer to carry a portable terminal having a wireless transceiver and a display;
   b) positioning a plurality of access nodes of a local area network at fixed, spaced-apart locations throughout the venue, each access node being in proximity with a different supplier of the transactions being offered at the venue, each access node having a wireless transceiver in wireless communication with the transceiver on the terminal when the customer is in proximity with the respective supplier proximally located to the respective access node;
   c) accessing a database for the respective supplier and retrieving a recommendation relating to the transactions being offered by the respective supplier; and
   d) displaying the recommendation on the display of the terminal for viewing by the customer.

2. The method of claim 1, wherein the displaying step includes the step of displaying different categories of products being offered by the respective supplier.

3. The method of claim 1, and the accessing step includes accessing a customer database in which shopping profiles are stored, and wherein the retrieving step includes retrieving selected transactions based on the shopping profile of the respective customer.

4. The method of claim 1, wherein the enabling step uniquely identifies the respective terminal with the respective customer.

5. The method of claim 1, and positioning a master access node of the network at a general location in the venue, the master access node having a wireless transceiver in wireless communication with the transceiver on the terminal when the customer is in proximity with the general location, and the step of displaying general information on the display for viewing by the customer.

\* \* \* \* \*